J. J. Adgate. Brake for Wagons etc.
116910
PATENTED JUL 11 1871
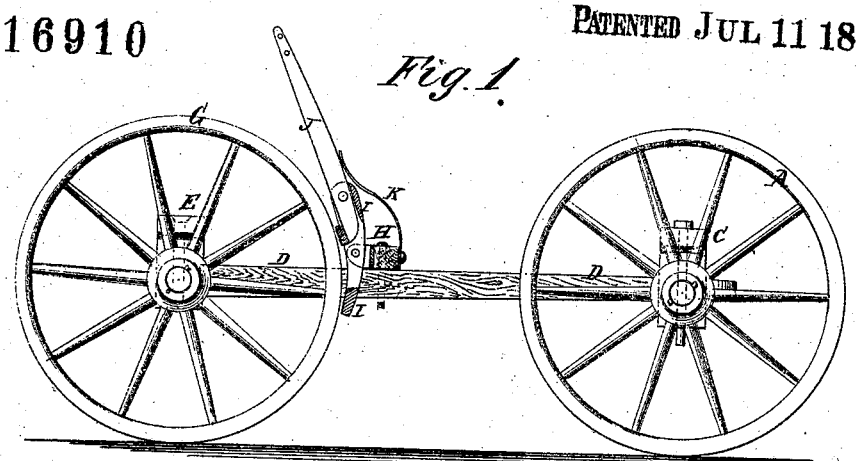
Fig. 1.
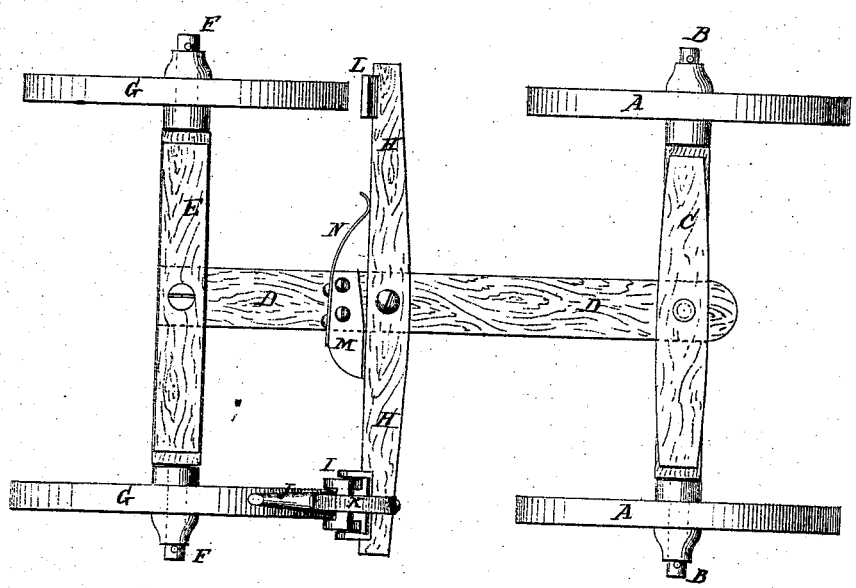
Fig. 2
Witnesses:
A. W. Almqvist
Wm. H. C. Smith.
Inventor:
J. J. Adgate.
PER 
Attorneys.

UNITED STATES PATENT OFFICE.

JOSEPH J. ADGATE, OF STEVENSVILLE, NEW YORK, ASSIGNOR TO HIMSELF AND RAYMOND M. WELLES, OF TOWANDA, PENNSYLVANIA.

IMPROVEMENT IN WAGON-BRAKES.

Specification forming part of Letters Patent No. 116,910, dated July 11, 1871.

*To all whom it may concern:*

Be it known that I, JOSEPH J. ADGATE, of Stevensville, in the county of Sullivan and State of New York, have invented a new and useful Improvement in Brake for Wagons, &c.; and I do hereby declare that the following is a full, clear, and exact description thereof, which will enable others skilled in the art to make and use the same, reference being had to the accompanying drawing forming part of this specification, in which—

Figure 1 is a side view of my improved brake as attached to a wagon, part being broken away to show the construction. Fig. 2 is a top view of the same.

Similar letters of reference indicate corresponding parts.

My invention has for its object to furnish an improved brake for attachment to wagons, cars, machinery, &c., which shall be simple in construction, easily operated, and powerful in operation; and it consists in the construction and combination of various parts of the brake, as hereinafter more fully described.

A represents the forward wheels; B, the forward axle; C, the forward bolster; D, the reach; E, the rear bolster; F, the rear axle; and G, the rear wheels, about the construction of all of which there is nothing new. H is a cross-bar, which is pivoted at its middle part to the reach D, to the rear hounds, or to some other part of the framework of the vehicle or machine. To one end of the cross-bar H is pivoted a lever brake-shoe, I, which is made long and somewhat curved, and to its upper end is pivoted a lever, J, the lower end of which extends down to, or nearly to, the middle part of the lever-shoe I. The lower ends of the lever J and of the lever brake-shoe I have shoes formed upon or attached to them to bear against the wheel. The middle part of the body of the lever-shoe I is cut away, as shown in Fig. 1, so that the dirt from the wheel may readily escape and may thus be prevented from clogging the brake. K is a spring, the lower end of which is attached to the end of the cross-bar H, and its other or free end rests against the lever J, as shown in Figs. 1 and 2. The spring K should have sufficient strength and should press against the lever J with sufficient force to hold the lower end of the lever J and the lower end of the lever-shoe I away from the wheel when the pressure is removed from the upper or free end of the lever J. As the upper end of the lever J is pressed back by the spring K its lower end is pressed forward against the upper part of the body of the lever-shoe I, which serves as a stop to the lever J, and prevents the upper part of said lever from being pushed back against the wheel. To the other end of the cross-bar H is attached a shoe, L, which, as the brake I J is applied to one wheel, is forced against the other wheel, so that the brake is applied to both wheels at the same time, and without any additional power being required, since the brake L is forced against the wheel by the reaction of the brake I J. M is a block attached to the reach, rear hounds, or other part of the frame of the vehicle or machine to which the cross-bar H is pivoted. To the block M is attached a spring, N, the free end of which presses against the rear side of the cross-bar H, upon the side of its pivoting-point toward the shoe L, with sufficient force to move the said brake-shoe L away from the wheel. The end of the block M opposite the spring N is so formed as to serve as a stop to the cross-bar H to prevent the end of the said cross-bar from being pushed so far back by the spring N as to bring the brake I J into contact with the wheel.

Power may be applied directly to the free end of the lever J, or it may be applied by means of a rope extending forward to the driver's seat, or by a lever or other suitable means.

By this construction the brake is applied with a compound leverage, and, at the same time, is double-acting, the reaction of the one part being utilized to operate the other part.

Having thus described my invention, I claim as new and desire to secure by Letters Patent—

1. The combination of the spring K, pivoted lever J, and pivoted lever brake-shoe I with each other, substantially as herein shown and described, and for the purpose set forth.

2. The combination of the stop-block M and spring N with the pivoted cross-bar H, to one end of which the brake-shoe L is attached, and to the other end of which is attached the brake I J K, substantially as herein shown and described, and for the purposes set forth.

The above specification of my invention signed by me this 10th day of April, 1871.

JOSEPH J. ADGATE.

Witnesses:
JAMES T. GRAHAM,
T. B. MOSHER.